(12) United States Patent
Park et al.

(10) Patent No.: US 11,312,280 B2
(45) Date of Patent: Apr. 26, 2022

(54) VEHICLE CARPET AND MAT FIXING DEVICE AND METHOD OF MOUNTING THE SAME

(71) Applicants: HYUNDAI MOTOR COMPANY, Seoul (KR); Kia Motors Corporation, Seoul (KR); Illinois Tool Works Inc., Glenview, IL (US)

(72) Inventors: You-Jin Park, Bucheon-si (KR); Jong-Woo Shim, Suwon-si (KR); Sang-Jun Park, Gimhae-si (KR); Chang-Min Kim, Incheon (KR)

(73) Assignees: Hyundai Motor Company, Seoul (KR); Kia Motors Corporation, Seoul (KR); Illinois Tool Works Inc., Glenview, IL (US)

( * ) Notice: Subject to any disclaimer, the term of this patent is extended or adjusted under 35 U.S.C. 154(b) by 126 days.

(21) Appl. No.: 16/687,355

(22) Filed: Nov. 18, 2019

(65) Prior Publication Data
US 2020/0164782 A1    May 28, 2020

(30) Foreign Application Priority Data
Nov. 23, 2018   (KR) .................. 10-2018-0146554

(51) Int. Cl.
*B60N 3/04* (2006.01)
*B62D 65/14* (2006.01)
*F16B 5/02* (2006.01)

(52) U.S. Cl.
CPC ............. *B60N 3/046* (2013.01); *B62D 65/14* (2013.01); *F16B 5/02* (2013.01); *B60N 3/042* (2013.01); *B60N 3/044* (2013.01)

(58) Field of Classification Search
CPC ........ B60N 3/046; B60N 3/048; B60N 3/044; B60N 3/042; Y10T 24/45775
See application file for complete search history.

(56) References Cited

U.S. PATENT DOCUMENTS

2010/0287748 A1*  11/2010  Courtin .................. B60N 3/046
24/700

FOREIGN PATENT DOCUMENTS

KR    10-2008-0103218 A    11/2008
KR       10-1580212 B1      4/2016

* cited by examiner

*Primary Examiner* — Jason L Vaughan
*Assistant Examiner* — Amanda Kreiling
(74) *Attorney, Agent, or Firm* — Mintz Levin Cohn Ferris Glovsky and Popeo, P.C.; Peter F. Corless (57) ABSTRACT

A vehicle carpet and mat fixing device may include an upper mat fastener part; a lower mat fastener part coupled to the upper mat fastener part; an upper carpet fastener part coupled to the lower mat fastener part by an upper carpet fastener protrusion protruding toward the lower mat fastener part; and a lower carpet fastener part coupled to the upper carpet fastener part, wherein the upper mat fastener part is hooked to the lower mat fastener part by an upper mat fastener hook circumferentially formed in the upper mat fastener part to fix a mat, and the lower carpet fastener part is coupled to the upper carpet fastener part by a male hook of the lower carpet fastener part to fix a carpet.

14 Claims, 7 Drawing Sheets

VEHICLE CARPET AND MAT FIXING DEVICE AND METHOD OF MOUNTING THE SAME

CROSS-REFERENCE(S) TO RELATED APPLICATIONS

This application claims priority to Korean Patent Application No. 10-2018-0146554, filed on Nov. 23, 2018, which is incorporated herein by reference in its entirety.

BACKGROUND OF THE DISCLOSURE

Field of the Disclosure

Embodiments of the present disclosure relate to a vehicle carpet and mat fixing device and a method of mounting the same; and, particularly, to a vehicle carpet and mat fixing device having a structure that can improve coupling force and assembly between a carpet and a mat, and a method of mounting the same.

Description of Related Art

In general, a floor carpet is provided on the interior floor of a vehicle, i.e., on a floor to beautify an indoor environment and perform a function such as sound absorption.

In addition, a vehicle mat is additionally installed on the upper surface the floor carpet to prevent contamination of the floor carpet.

Meanwhile, the vehicle mat may be easily moved without being kept in position since it is composed of a large number of pieces, with the consequence that it difficult to perform a function of preventing the contamination of the floor carpet during movement. In particular, the vehicle mat provided at a driver's seat hinders the operation of a brake pedal and an accelerator pedal during movement, which leads to a difficulty of desired acceleration as well as a worry about accidents.

The disclosure of this section is to provide background information relating to the invention. Applicant does not admit that any information contained in this section constitutes prior art.

SUMMARY OF THE DISCLOSURE

An embodiment of the present disclosure is directed to a vehicle carpet and mat fixing device capable of solving a weakening of coupling force between a carpet and a mat and an occurrence of scrap when they are reassembled after assembly, thereby reassembling them and improving assembly process capability, and a method of mounting the same.

In accordance with an embodiment of the present disclosure, a vehicle carpet and mat fixing device includes a upper mat fastener part, a lower mat fastener part coupled to the upper mat fastener part, a upper carpet fastener part coupled to the lower mat fastener part by a upper carpet fastener protrusion protruding toward the lower mat fastener part, and a lower carpet fastener part coupled to the upper carpet fastener part, wherein the upper mat fastener part is hooked to the lower mat fastener part by a upper mat fastener hook circumferentially formed in the upper mat fastener part to fix a mat, and the lower carpet fastener part is coupled to the upper carpet fastener part by a female hook of the lower carpet fastener part to fix a carpet.

The upper mat fastener part may include an upper mat fastener body and an upper mat fastener extension extending downward from the center of the upper mat fastener body.

The upper mat fastener extension may have an upper mat fastener hook formed circumferentially outward at its end.

The lower mat fastener part may include a lower mat fastener body and a lower mat fastener extension extending upward from the center of the lower mat fastener body.

The lower mat fastener extension may have a lower mat fastener latch formed circumferentially inward at its end, the lower mat fastener latch being coupled to an upper mat fastener hook of an upper mat fastener extension.

The lower mat fastener body may have a coupling hole drilled therein for coupling with the upper carpet fastener part.

The lower mat fastener body has a lip formed therein for coupling with the upper carpet fastener protrusion.

The lower mat fastener body may have mat fixing protrusions formed on one surface thereof.

The mat fixing protrusions may be spaced circumferentially from each other.

The upper carpet fastener part may include an upper carpet fastener body and an upper carpet fastener protrusion protruding upward from the upper carpet fastener body.

The upper carpet fastener body may have a male hook formed on its outer surface.

The upper carpet fastener protrusion may be coupled to the lower mat fastener part.

The lower carpet fastener part may have a female hook formed at its inner end.

The female hook may have a detachable structure.

The lower carpet fastener part may have carpet fixing protrusions formed on its inner diameter.

The carpet fixing protrusions may be spaced circumferentially from each other.

In accordance with another embodiment of the present disclosure, a method of mounting a vehicle carpet and mat fixing device includes fixing a mat between an upper mat fastener part and a lower mat fastener part, coupling an upper carpet fastener part to the lower mat fastener part, and fixing a carpet between the upper carpet fastener part and a lower carpet fastener part.

The fixing a mat may include inverting the upper mat fastener part to place it on the ground, fixing the mat to the upper mat fastener part, and coupling the upper mat fastener part to the lower mat fastener part.

The fixing a carpet may include inverting the upper carpet fastener part to place it on the ground, fixing the carpet to the upper carpet fastener part, and coupling the upper carpet fastener part to the lower carpet fastener part.

DESCRIPTION OF EMBODIMENTS

Embodiments to be described below are provided in order for those skilled in the art to easily understand the technical spirit of the present disclosure, and the present disclosure is not restricted by the embodiments. Furthermore, the contents expressed in the accompanying drawings have been diagrammed to easily describe the embodiments of the present disclosure, and may be different from those that are actually implemented.

It will be understood that when an element is referred to as being "connected or joined" to another element, it can be "directly connected or joined" to the other element or it can be "indirectly connected or joined" to the other element with other elements being interposed therebetween.

In this case, the term "connect" includes direct connection or indirect connection between one member and the other member, and may mean all of physical connections, such as adhesion, attachment, coupling, bonding, and combination.

In addition, the terms "first", "second", etc., are used to only distinguish a plurality of elements from one another and do not limit the sequence or other characteristics of the elements.

The terminology used in the specification of the present disclosure is for the purpose of describing particular embodiments only and is not intended to limit the disclosure. As used in the specification and the appended claims, the singular forms are intended to include the plural forms as well, unless context clearly indicates otherwise. It will be further understood that the terms "comprises", "includes", "comprising", and/or "including" when used in this specification, specify the presence of stated features, regions, integers, steps, operations, elements, and/or components, but do not preclude the presence or addition of one or more other features, regions, integers, steps, operations, elements, and/or components thereof.

In implementations of mat fixing technologies, various mat fixing clips may be proposed to prevent the movement of the mat. These mat fixing clips are installed to the carpet to prevent the movement of the mat. In order to install each mat fixing clip to the carpet, a hook, which protrudes from one side of the bottom of the mat fixing clip, and a lower plate, which rotates from the other side of the bottom of the mat fixing clip to fasten the hook, are inserted into the carpet.

The clip press-fitted to the mat may be decoupled from the mat by external forces, shocks or impacts when the mat is cleaned during use.

On the other hand, when the clip press-fitted to the carpet is misassembled in the production line, a large amount of scrap may occur since it is not easy to refasten the clip.

In one implementation, the clip press-fitted to the mat, which is formed in a tree type, allows for eccentric assembly, which may cause its fixing force to weaken.

In addition, the clip press-fitted to the mat may cause a process delay and a quality issue since the assembly portion thereof is not visible with the naked eye so that there is a possibility of misassembly in an assembly line.

Figure 1:
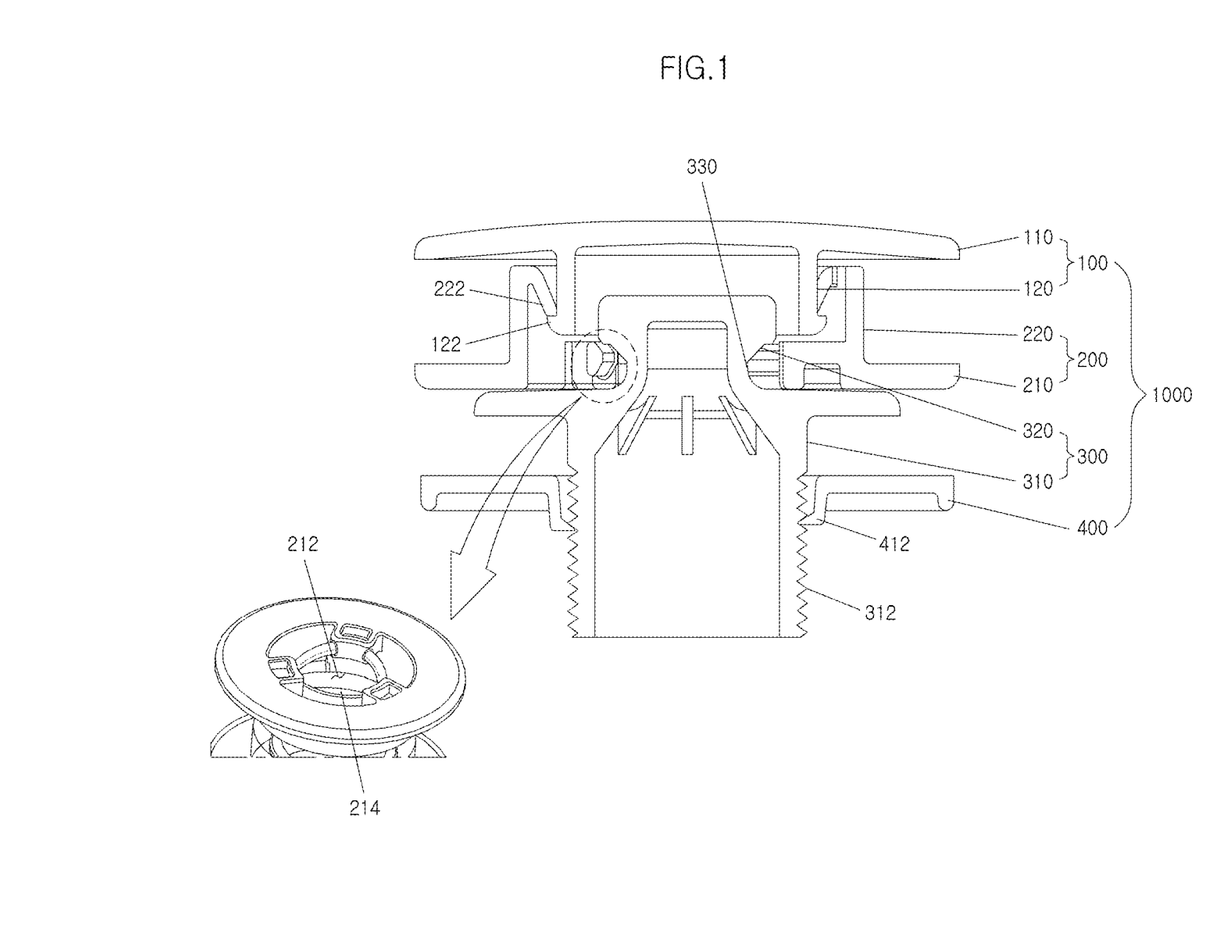
FIG. 1 is a schematic view illustrating a vehicle carpet and mat fixing device according to an embodiment of the present disclosure.

FIG. 1 is a schematic view illustrating a vehicle carpet and mat fixing device according to an embodiment of the present disclosure.

Referring to FIG. 1, the vehicle carpet and mat fixing device, which is designated by reference numeral 1000, according to the embodiment of the present disclosure includes a mat fastener and a carpet fastener which is coupled to the mat fastener. The mat fastener includes an upper mat fastener part 100, a lower mat fastener part 200 coupled to the upper mat fastener part 100. The carpet fastener includes an upper carpet fastener part 300 coupled to the lower mat fastener part 200 by an upper carpet fastener protrusion 320 protruding toward the lower mat fastener part 200, and a lower carpet fastener part 400 coupled to the upper carpet fastener part 300.

In one specific example, the upper mat fastener part 100 includes an upper mat fastener body 110 and an upper mat fastener extension 120 extending downward from the center of the upper mat fastener body 110.

The lower mat fastener part 200 includes a lower mat fastener body 210 and a lower mat fastener extension 220 extending upward from the center of the lower mat fastener body 210. The lower mat fastener extension 220 has a lower mat fastener latch 222 formed at the end thereof.

According to the present disclosure, the upper carpet fastener part 300 includes an upper carpet fastener body 310 and an upper carpet fastener protrusion 320 protruding upward from the upper carpet fastener body 310. A concave-shaped recess 330 is formed between the upper carpet fastener body 310 and the upper carpet fastener protrusion 320.

Figure 2:
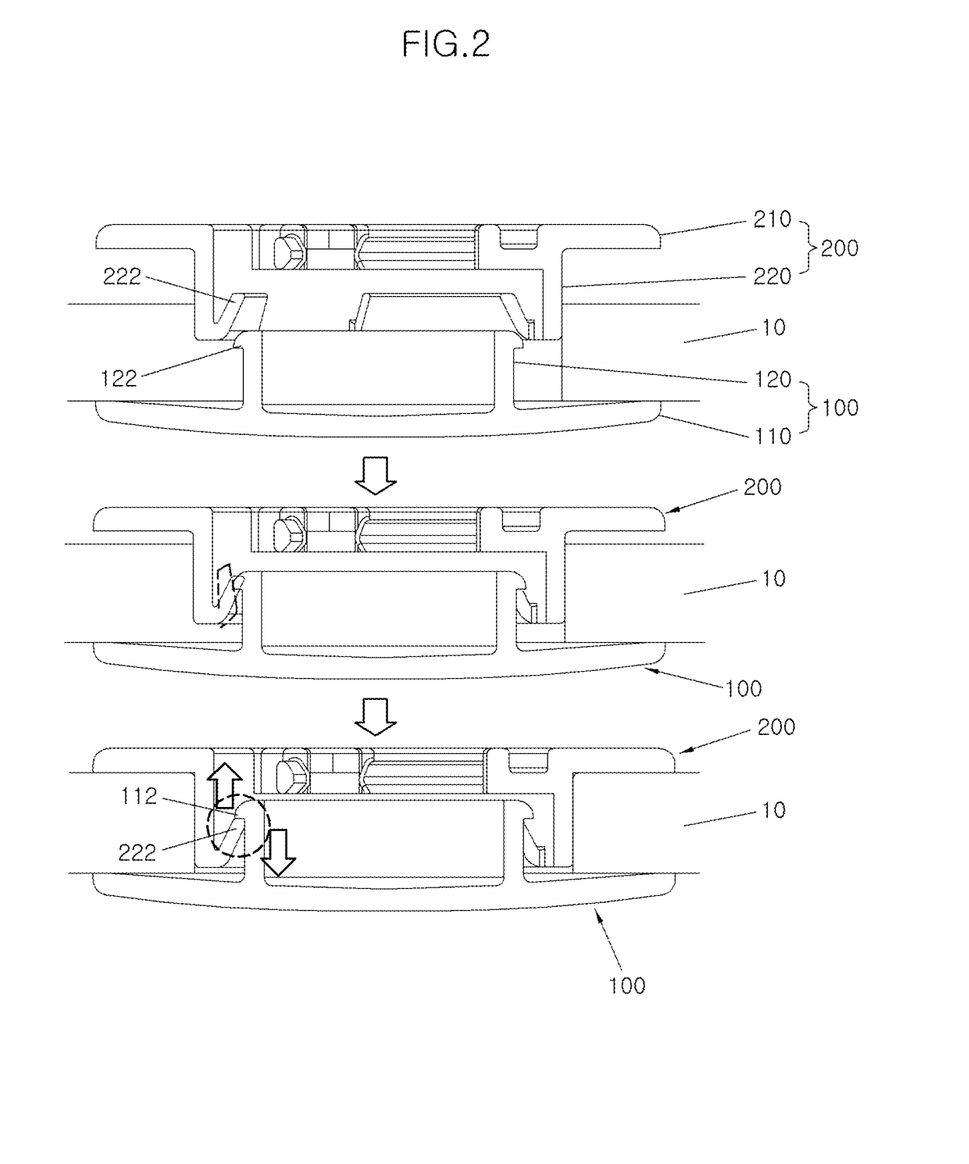
FIG. 2 is a schematic view illustrating a coupling process of a mat coupling portion in the vehicle carpet and mat fixing device according to the embodiment of the present disclosure.

In one specific example, the upper mat fastener part 100 is hooked to the lower mat fastener part 200 by an upper mat fastener hook 122 circumferentially formed in the upper mat fastener part 100, thereby fixing a mat 10 (see FIG. 2). The lower carpet fastener part 400 is coupled to the upper carpet fastener part 300 by a female hook 412 of the lower carpet fastener part 400, thereby fixing a carpet 20 (see FIG. 4).

The female hook 412 is structured to be returned to its original position by elasticity after it is tilted backward when coupled to a male hook 312 (see FIG. 4) of the upper carpet fastener part 300.

Figure 3:
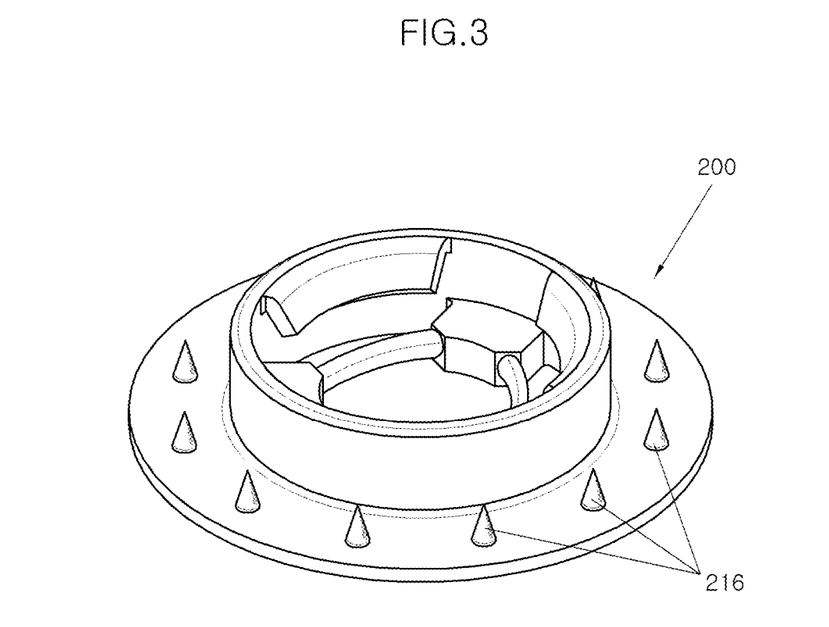
FIG. 3 is a schematic view illustrating a lower mat fastener part in the vehicle carpet and mat fixing device according to the embodiment of the present disclosure.

FIG. 2 is a schematic view illustrating a coupling process of the mat coupling portion in the vehicle carpet and mat fixing device according to the embodiment of the present disclosure. FIG. 3 is a schematic view illustrating the lower mat fastener part in the vehicle carpet and mat fixing device according to the embodiment of the present disclosure.

Referring to FIGS. 2 and 3 together with FIG. 1, the upper mat fastener part 100 includes the upper mat fastener body 110 and the upper mat fastener extension 120 extending downward from the center of the upper mat fastener body 110. The upper mat fastener hook 122 is formed circumferentially outward at the end of the upper mat fastener extension 120.

In one specific example, the lower mat fastener part 200 includes the lower mat fastener body 210 and the lower mat fastener extension 220 extending upward from the center of the lower mat fastener body 210.

The lower mat fastener latch 222 is formed circumferentially inward at the end of the lower mat fastener extension 220 so that the lower mat fastener latch 222 is coupled to the upper mat fastener hook 122 of the upper mat fastener extension 120. The lower mat fastener latch 222 is returned to its original position by elasticity after it is tilted when coupled to the upper mat fastener hook 122. In embodiments, the upper mat fastener hook 122 and the lower mat fastener latch 222 are spaced apart from each other based on the plane.

The upper mat fastener part 100 and the lower mat fastener extension 220 are coupled to each other to fix the mat 10.

According to the present disclosure, the lower mat fastener body 210 has a coupling hole 212 drilled therein for coupling with the upper carpet fastener part 300.

The lower mat fastener body 210 has a lip 214 formed therein for coupling with the recess 330 of the upper carpet fastener part 300. The lip 214 is spaced inward from the coupling hole 212 to be positioned at the recess 330.

In such a structure, the lower mat fastener body 210 has mat fixing protrusions 216 formed on one surface thereof. In embodiments, the mat fixing protrusions 216 are spaced circumferentially from each other.

Figure 4:
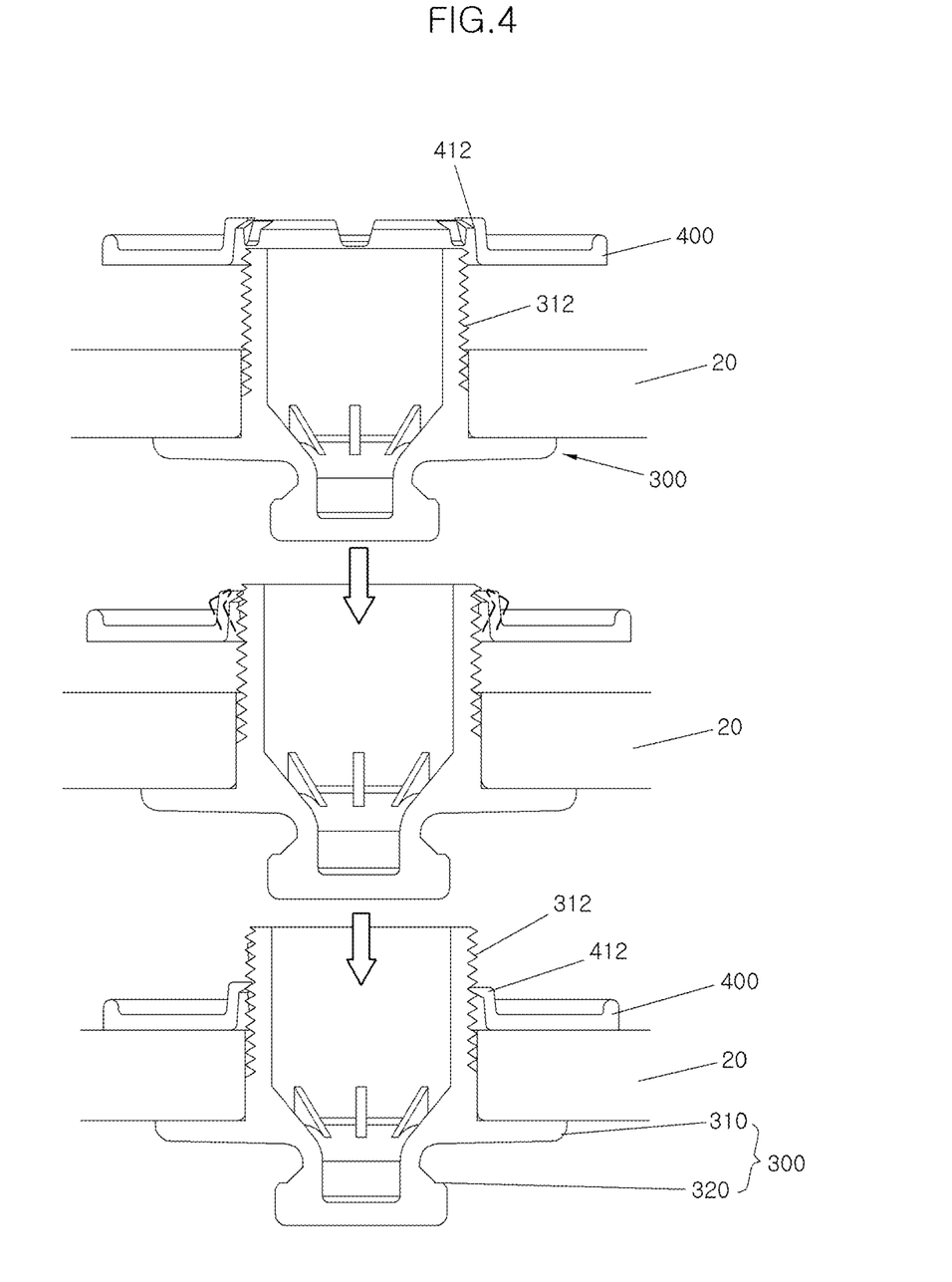
FIG. 4 is a schematic view illustrating a coupling process of a carpet coupling portion in the vehicle carpet and mat fixing device according to the embodiment of the present disclosure.
Figure 5:
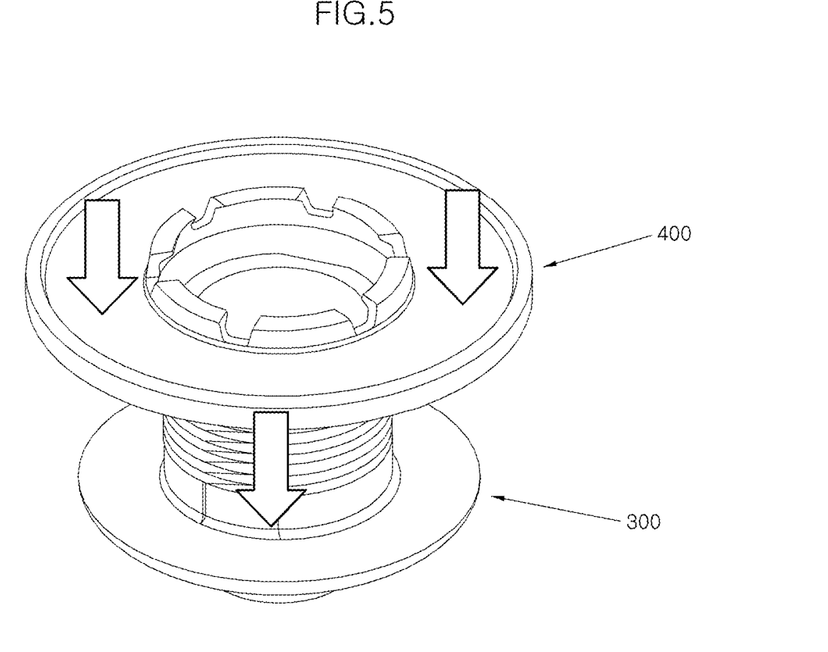
FIG. 5 is a schematic view illustrating a coupling example of the carpet coupling portion in the vehicle carpet and mat fixing device according to the embodiment of the present disclosure.
Figure 6:
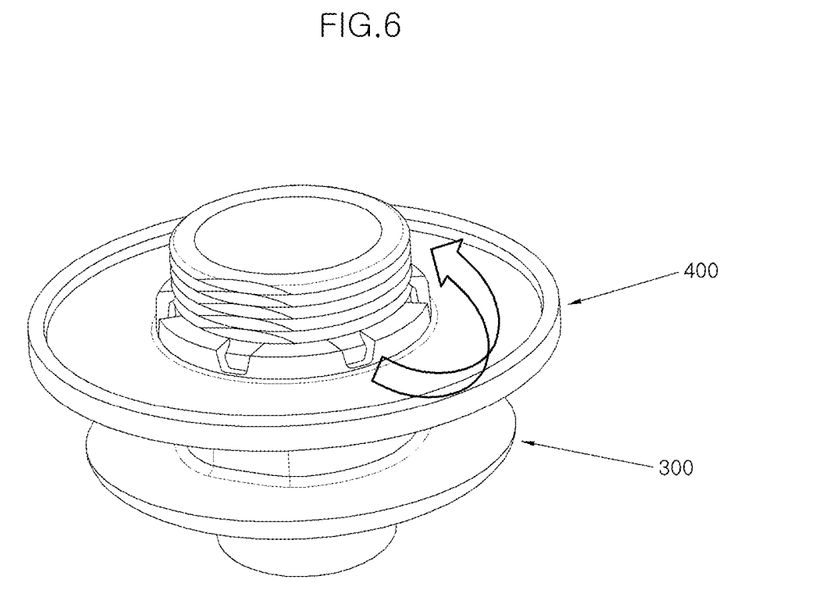
FIG. 6 is a schematic view illustrating a decoupling example of the carpet coupling portion in the vehicle carpet and mat fixing device according to the embodiment of the present disclosure.
Figure 7:
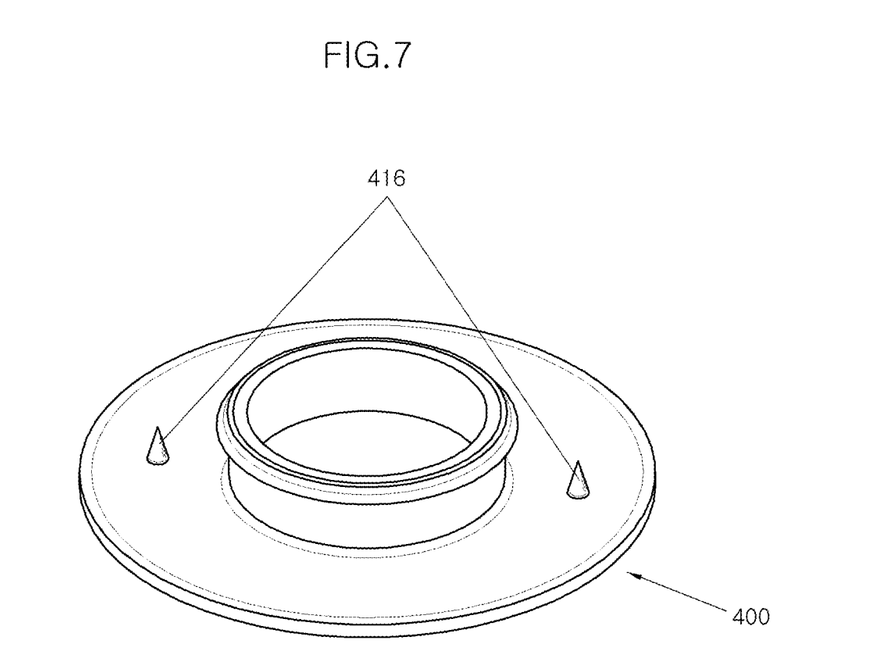
FIG. 7 is a schematic view illustrating a lower carpet fastener part in the vehicle carpet and mat fixing device according to the embodiment of the present disclosure.

FIG. 4 is a schematic view illustrating a coupling process of the carpet coupling portion in the vehicle carpet and mat fixing device according to the embodiment of the present disclosure. FIG. 5 is a schematic view illustrating a coupling example of the carpet coupling portion in the vehicle carpet and mat fixing device according to the embodiment of the present disclosure. FIG. 6 is a schematic view illustrating a decoupling example of the carpet coupling portion in the vehicle carpet and mat fixing device according to the embodiment of the present disclosure. FIG. 7 is a schematic view illustrating the lower carpet fastener part in the vehicle carpet and mat fixing device according to the embodiment of the present disclosure.

Referring to FIGS. 4 to 7 together with FIG. 1, the upper carpet fastener part 300 includes the upper carpet fastener body 310 and the upper carpet fastener protrusion 320 protruding upward from the upper carpet fastener body 310. The upper carpet fastener protrusion 320 is coupled to the lower mat fastener part 200.

In such a structure, the male hook 312 is formed on the outer surface of the upper carpet fastener body 310 and may have a thread shape.

In one specific example, the female hook 412 is formed at the inner end of the lower carpet fastener part 400 and has a detachable structure. In embodiments, the female hook 412 has grooves spaced apart from each other based on the plane.

The lower carpet fastener part 400 has carpet fixing protrusions 416 formed on the inner diameter thereof. In embodiments, the carpet fixing protrusions 416 are spaced circumferentially from each other.

The carpet 20 is fixed between the upper carpet fastener part 300 and the lower carpet fastener part 400.

Therefore, since the carpet can be rotatably decoupled after coupling to be decoupled and reassembled even after coupling, it is possible to prevent an occurrence of scrap.

Figure 8:
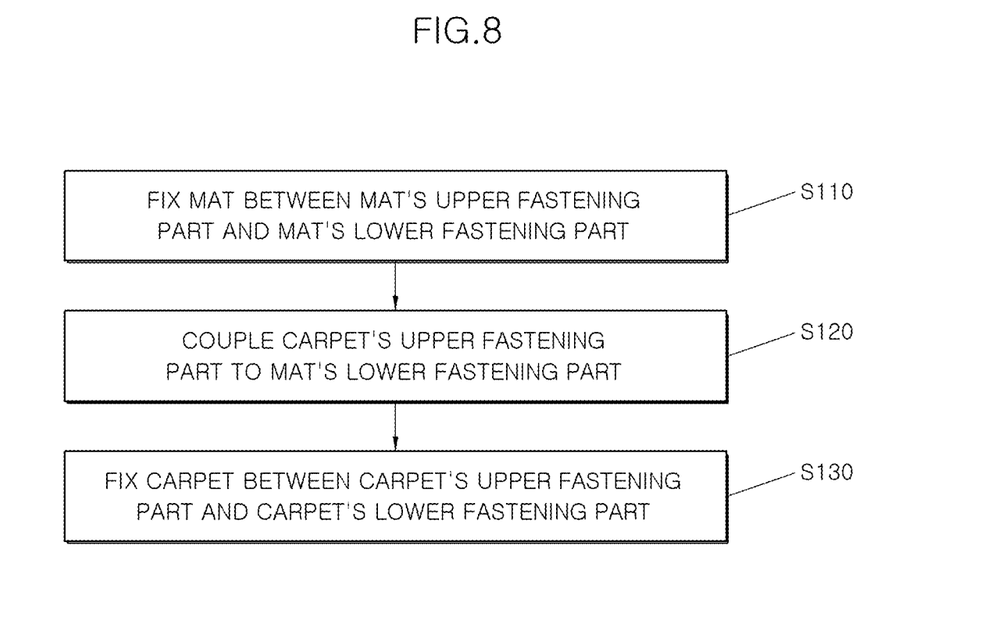
FIG. 8 is a flowchart illustrating a method of mounting a vehicle carpet and mat fixing device according to an embodiment of the present disclosure.

FIG. 8 is a flowchart illustrating a method of mounting a vehicle carpet and mat fixing device according to an embodiment of the present disclosure.

The operating relationship and mounting method of a vehicle carpet and mat fixing device and according to the embodiment of the present disclosure will be described with reference to the figures. The vehicle carpet and mat fixing device 1000 according to the embodiment of the present disclosure includes a upper mat fastener part 100, a lower mat fastener part 200 coupled to the upper mat fastener part 100, a upper carpet fastener part 300 coupled to the lower mat fastener part 200 by a upper carpet fastener protrusion 320 protruding toward the lower mat fastener part 200, and a lower carpet fastener part 400 coupled to the upper carpet fastener part 300. A mat 10 is fixed between the upper mat fastener part 100 and the lower mat fastener part 200 (S 110). The upper carpet fastener part 300 is coupled to the lower mat fastener part 200 (S 120). Thereafter, a carpet 20 is fixed between the upper carpet fastener part 300 and the lower carpet fastener part 400 (S 130).

In one specific example, in the step of fixing the mat 10, the upper mat fastener part 100 is inverted and place on the ground, and the upper mat fastener part 100 is coupled to the lower mat fastener part 200 after the mat 10 is fixed to the upper mat fastener part 100.

In the step of fixing the carpet 20, the upper carpet fastener part 300 is inverted and place on the ground, and the upper carpet fastener part 300 is coupled to the lower carpet fastener part 400 after the carpet 20 is fixed to the upper carpet fastener part 300.

Figure 9:
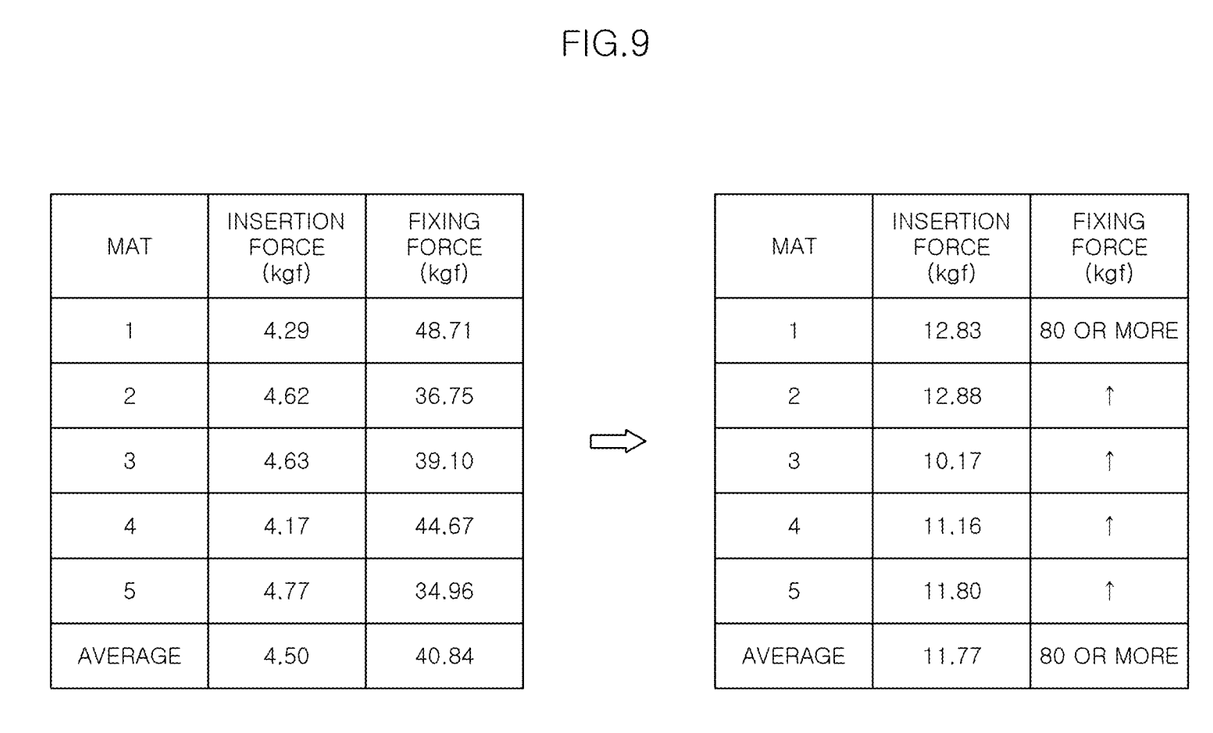
FIG. 9 is a table illustrating an experimental example of the vehicle carpet and mat fixing device according to the embodiment of the present disclosure.

FIG. 9 is a table illustrating an experimental example of the vehicle carpet and mat fixing device according to the embodiment of the present disclosure.

In FIG. 9, the left side shows experimental results of the fixing force of existing fixing device, while the right side shows experimental results of the fixing force of the fixing device according to one embodiment of the present invention. Referring to left side table and right side table of FIG. 9, it can be seen that the insertion force and fixing force in the vehicle carpet and mat fixing device according to the embodiment of the present disclosure is more than two times of that in the existing fixing device.

Therefore, the vehicle carpet and mat fixing device and the method of mounting the same according to the present disclosure can strengthen the coupling force between the carpet and the mat and reassembly them after assembly, thereby preventing the occurrence of scrap. In addition, it is possible to provide an effect of improving process efficiency and quality since the assembly portion can be checked with the naked eye to prevent missassembly.

In accordance with the vehicle carpet and mat fixing device and the method of mounting the same of the embodiments of the present disclosure, it is possible to strengthen the coupling force between the carpet and the mat and to reassembly them after assembly, thereby providing an effect of preventing the occurrence of scrap.

In addition, it is possible to provide an effect of improving process efficiency and quality since the assembly portion can be checked with the naked eye to prevent missassembly.

While the present disclosure has been particularly shown and described with reference to embodiments thereof, it will be understood by those skilled in the art that various changes in form and details may be made therein without departing from the spirit and scope of the disclosure as defined by the appended claims. The embodiments should be considered in descriptive sense only and not for purposes of limitation. Therefore, the scope of the disclosure is defined not by the detailed description of the disclosure but by the appended claims, and all differences within the scope will be construed as being included in the present disclosure. Furthermore, the terms and words used in the specification and claims should not be construed as their ordinary or dictionary sense. On the basis of the principle that the inventor can define the appropriate concept of a term in order to describe his/her own disclosure in the best way, it should be construed as meaning and concepts for complying with the technical idea of the present disclosure. In addition, processes described stepwise are not necessarily performed in time sequential order and when the spirit of the present disclosure is satisfied even though an order of performing each step is changed, the processes are included in the scope of the present disclosure.

What is claimed is:

1. A vehicle carpet and mat fixing device comprising:
   an upper mat fastener part;
   a lower mat fastener part coupled to the upper mat fastener part;
   an upper carpet fastener part coupled to the lower mat fastener part by an upper carpet fastener protrusion protruding toward the lower mat fastener part; and
   a lower carpet fastener part coupled to the upper carpet fastener part,
   wherein the upper mat fastener part is hooked to the lower mat fastener part by an upper mat fastener hook circumferentially formed in the upper mat fastener part to fix a mat, and the lower carpet fastener part is coupled to the upper carpet fastener part by a female hook of the lower carpet fastener part to fix a carpet,
   wherein the upper mat fastener part comprises:
   an upper mat fastener body; and
   an upper mat fastener extension extending downward from the center of the upper mat fastener body, and
   wherein the upper mat fastener extension has an upper mat fastener hook formed circumferentially outward at its end.

2. The vehicle carpet and mat fixing device of claim 1, wherein the lower mat fastener part comprises:
   a lower mat fastener body; and
   a lower mat fastener extension extending upward from the center of the lower mat fastener body.

3. The vehicle carpet and mat fixing device of claim 2, wherein the lower mat fastener extension has a lower mat fastener latch formed circumferentially inward at its end, the lower mat fastener latch being coupled to the upper mat fastener hook of an upper mat fastener extension.

4. The vehicle carpet and mat fixing device of claim 2, wherein the lower mat fastener body has a coupling hole drilled therein for coupling with the upper carpet fastener part.

5. The vehicle carpet and mat fixing device of claim 2, wherein the lower mat fastener body has a lip formed therein for coupling with a recess of the upper carpet fastener part.

6. The vehicle carpet and mat fixing device of claim 2, wherein the lower mat fastener body has mat fixing protrusions formed on one surface thereof.

7. The vehicle carpet and mat fixing device of claim 6, wherein the mat fixing protrusions are spaced circumferentially from each other.

8. The vehicle carpet and mat fixing device of claim 1, wherein the upper carpet fastener part comprises:
   an upper carpet fastener body; and
   an upper carpet fastener protrusion protruding upward from the upper carpet fastener body.

9. The vehicle carpet and mat fixing device of claim 8, wherein the upper carpet fastener body has a male hook formed on its outer surface.

10. The vehicle carpet and mat fixing device of claim 8, wherein the upper carpet fastener protrusion is coupled to the lower mat fastener part.

11. The vehicle carpet and mat fixing device of claim 1, wherein the lower carpet fastener part has the female hook formed at its inner end.

12. The vehicle carpet and mat fixing device of claim 11, wherein the female hook has a detachable structure.

13. The vehicle carpet and mat fixing device of claim 1, wherein the lower carpet fastener part has carpet fixing protrusions formed on its inner diameter.

14. The vehicle carpet and mat fixing device of claim 13, wherein the carpet fixing protrusions are spaced circumferentially from each other.

* * * * *